(12) United States Patent
Baldwin

(10) Patent No.: US 6,511,931 B1
(45) Date of Patent: Jan. 28, 2003

(54) EASY-TO-CLEAN MATTE ACID RESISTANT GROUND COAT

(75) Inventor: Charles A. Baldwin, Parma, OH (US)

(73) Assignee: Ferro Corporation, Cleveland, OH (US)

(*) Notice: Subject to any disclaimer, the term of this patent is extended or adjusted under 35 U.S.C. 154(b) by 0 days.

(21) Appl. No.: 09/906,177

(22) Filed: Jul. 16, 2001

(51) Int. Cl.⁷ .............................. C03C 8/22; C03C 3/21; C03C 8/08; C03C 27/00; C03C 4/20

(52) U.S. Cl. .............................. 501/16; 501/14; 501/21; 501/24; 501/45; 501/46; 501/73; 501/77; 501/32; 428/432; 428/426; 428/469; 428/471

(58) Field of Search .............................. 501/11, 14, 15, 501/16, 17, 18, 20, 21, 24, 25, 41, 45, 46, 73, 77; 428/434, 469, 426, 432, 471, 472.2, 472.3

(56) References Cited

U.S. PATENT DOCUMENTS 3,580,733 A * 5/1971 Ott .......................... 126/19 R
4,084,975 A   4/1978 Faust ........................ 501/16

* cited by examiner

Primary Examiner—Mark L. Bell
Assistant Examiner—Elizabeth A. Bolden
(74) Attorney, Agent, or Firm—Rankin, Hill, Porter & Clark LLP

(57) ABSTRACT

The present invention provides a ground coat composition for use in forming an enamel layer on sheet steel that exhibits good spot acid resistance, a satin finish, good bond, and is easy-to-clean. The composition according to the invention includes a glass component that includes a blend of from about 40% to about 70% by weight of a first glass portion including one or more alkali aluminophosphate frits, up to about 30% by weight of a second glass portion including one or more zirconia-phosphate frits, and up to about 30% by weight of a third glass portion including one or more alkali borosilicate frits.

18 Claims, No Drawings

EASY-TO-CLEAN MATTE ACID RESISTANT GROUND COAT

FIELD OF INVENTION

The present invention provides an enamel ground coat composition for use on sheet steel. More particularly, the present invention provides a ground coat composition for use in forming an enamel layer on cleaned-only sheet steel that exhibits good spot acid resistance, a satin finish, good bond, and is easy-to-clean.

BACKGROUND OF THE INVENTION

An oven can be one of the most difficult kitchen appliances to clean. Food that splatters onto the interior surfaces of the oven during cooking usually becomes baked-on, making the removal thereof particularly difficult. If the oven is not cleaned often, the amount of baked-on food can build up rapidly, thereby increasing the cleaning difficulty.

There are several known methods for facilitating the removal of baked-on food from the interior surfaces of ovens. The most widely used methods involve pyrolysis or the application of highly alkaline chemical oven cleaners. Although these known methods are relatively effective for removing baked-on food from the interior surfaces of ovens, they present several disadvantages.

Many ovens feature a high-temperature "self-cleaning" cycle during which baked-on foods are pyrolyzed (i.e., decomposed) to carbon ash residue that can be wiped from the interior surfaces of the oven once it cools. To be effective, such pyrolytic heating cycles must maintain the temperature within the oven cavity above about 480° C. (900° F.) for a period of approximately 60 minutes.

One of the disadvantages of using pyrolysis to remove baked-on food from the interior surfaces of ovens is the tendency for the porcelain enamels applied to the interior surfaces of ovens to craze and in some cases flake off when they are repeatedly exposed to such elevated temperatures. Moreover, ovens having pyrolytic heating cycles are more expensive to manufacture than conventional ovens due to the need for extra insulation. Furthermore, such ovens are more expensive to operate than conventional ovens because of the power consumed to generate and maintain the high temperatures during the pyrolytic heating cycle. Such ovens can also present safety concerns because the exterior surfaces of the oven can become quite hot during the pyrolytic heating cycle.

Another method for facilitating the removal of baked-on food from the interior surfaces of ovens involves the use of "catalytic" enamel compositions such as the composition disclosed in Faust, U.S. Pat. No. 4,084,975. Catalytic enamel compositions such as disclosed in Faust that have been fired on the interior surfaces of ovens have a porous texture and contain a substantial quantity of metallic oxides that can catalyze the oxidation of food material that is spilled or spattered on the surface of the enamel. In operation, food material is absorbed into the porous enamel surface where the catalytic metallic oxides catalyze oxidation of the food material at a substantially lower temperature than is required for pyrolytic enamels.

One of the disadvantages of the use of catalytic enamels on the interior surfaces of ovens is that the pores in the enamel can rapidly become saturated and clogged with food material, which significantly diminishes the ease with which the enamel can be cleaned. Furthermore, because the surface of a catalytic enamel coating is porous, it is readily subject to staining.

The other widely used method for removing baked-on food from the interior surfaces of ovens involves the use of highly alkaline chemical oven cleaners. Most oven cleaners of this type include significant quantities of caustics, such as sodium hydroxide and/or potassium hydroxide. While such products are relatively effective in their ability to remove baked-on food from the interior surfaces of ovens, they are highly alkaline (pH typically greater than about 12) and therefore present safety hazards. Fumes from such products, which are best used when the oven is warm, can irritate the eyes and throat and can also cause chemical skin burns. Moreover, the resulting product of the chemical reaction between these cleaners and baked-on food is unpleasant to handle.

There exists a need for a composition that can be applied to the interior surfaces of oven cavities and other articles from which baked-on foods can be removed without the need for pyrolysis or highly alkaline cleaners.

SUMMARY OF INVENTION

The present invention provides a ground coat composition for use in forming an enamel layer on cleaned-only sheet steel that exhibits good spot acid resistance, a matte to satin finish, good bond, and is easy-to-clean (i.e., food residue can be easily removed using water, steam, or humid air). The composition according to the invention comprises a glass component comprising a blend of from about 40% to about 70% by weight of a first glass portion comprising one or more alkali aluminophosphate frits, up to about 30% by weight of a second glass portion comprising one or more zirconia-phosphate frits, and up to about 30% by weight of a third glass portion comprising one or more alkali borosilicate frits. The present invention also provides an article having at least one steel surface coated with an enamel ground coat formed by applying a composition according to the invention to the steel surface and then firing the composition.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF PREFERRED EMBODIMENTS

The enamel ground coat composition according to the present invention comprises a glass component comprising a blend of from about 40% to about 70% by weight of a first glass portion comprising one or more alkali aluminophosphate frits, up to about 30% by weight of a second glass portion comprising one or more zirconia-phosphate frits, and up to about 30% by weight of a third glass portion comprising one or more alkali borosilicate frits. Alkali aluminophosphate frits generally comprise by weight from about 15 to about 30% $Al_2O_3$, from about 20% to about 60% $P_2O_5$, and from about 5% to about 30% alkali metal oxides. Zirconium-phosphate frits generally comprise by weight from about 20% to about 40% $ZrO_2$, from about 15% to about 40% $P_2O_5$, from about 5% to about 30% alkali metal oxides, and from about 5% to about 40% $SiO_2$. Alkali borosilicate frits generally contain from about 5% to about 30% $B_2O_3$, from about 30% to about 70% $SiO_2$, and from about 5% to about 35% alkali metal oxides. Some alkali borosilicate frits are known in the art as "no pickle-no nickel" ground coats when the glass also contains $Co_2O_3$, NiO, MnO, $Fe_2O_3$, and the like for adhesion to cleaned-only steel.

The alkali aluminophosphate frits used in the composition according to the invention preferably comprise by weight from about 30% to about 50% $P_2O_5$, from about 20% to about 25% $Al_2O_3$, from about 10% to about 25% $Na_2O$, up to about 10% $K_2O$, up to about 10% $SiO_2$, up to about 5% $B_2O_3$, from about 1% to about 3% NiO, from about 1% to about 2% $MnO_2$, from about 1% to about 3% $Co_2O_3$, up to about 3% $Li_2O$ from about 0.5% to about 1.5% $Fe_2O_3$, from about 1% to about 2% CuO, up to about 1% $Sb_2O_3$, and up to about 0.5% $MoO_3$, and up to about 4% ZnO. The CuO, $Co_2O_3$, and NiO are present in the frit to assist in obtaining a good bond to steel. Alkali aluminophosphate frits are generally soft and can be fired at a temperature below about 600° C.

The zirconia-phosphate frits used in the composition according to the invention preferably comprise by weight from about 25% to about 35% $ZrO_2$, from about 20% to about 30% $P_2O_5$, from about 10% to about 20% $SiO_2$, from about 10% to about 25% $Na_2O$, from about 5% to about 10% $K_2O$, up to about 8% $TiO_2$, up to about 7% BaO, from about 0.05% to about 3% $Co_2O_3$, and up to about 3% NiO. The high $ZrO_2$ content of these frits results in an enamel exhibiting good resistance to chemical attack. The $TiO_2$ content of the frit appears to control the gloss of the enamel, with higher $TiO_2$ loadings resulting in a more matte appearance. Zirconia-phosphate frits are generally considered to be hard, and are generally fired above 815° C.

It will be appreciated that combinations of two or more zirconia-phosphate frits can be used in the composition according to the invention. For example, the composition could comprise two zirconia-phosphite frits: one containing $TiO_2$ to give the fired enamel a matte finish; and a another containing $Co_2O_3$ and NiO to assist in bonding to steel. Generally speaking, the alkali aluminophosphate frits control bonding of the enamel to steel whereas the zirconia-phosphite frits control chemical durability at the expense of bond.

The alkali borosilicate frits used in the composition according to the invention preferably comprise by weight from about 40% to about 60% $SiO_2$, from about 10% to about 25% $Na_2O$, from about 10% to about 15% $B_2O_3$, up to about 5% CaO, up to about 3% $Li_2O$, up to about 5% $TiO_2$, from about 1% to about 5% $ZrO_2$, from about 1% to about 3% NiO, from about 1% to about 3% $Co_2O_3$, from about 1% to about 2% CuO, and up to about 1% $Al_2O_3$. Again, NiO, $Co_2O_3$, and CuO, are preferably present in such frits to assist in bonding to steel. The relatively high $SiO_2$ content of these frits assists in obtaining an enamel having good chemical durability. Alkali borosilicate frits are generally fired at about 815° C.

The frits comprising the glass component of the composition according to the invention may be prepared utilizing conventional glass melting techniques. Typically, a conventional ceramic refractory, fused silica, or platinum crucible are used to prepare the frits. Selected oxides are smelted at temperatures of from about 1350° C. to about 1600° C. for about 30 to 40 minutes. The molten glass formed in the crucible is then converted to glass frit using water-cooled steel rollers or water quenching. It will be appreciated that the step of producing the frits is not per se critical and any of the various techniques well-known to those skilled in the art can be employed.

Depending upon the particular application technique being employed, the glass component will preferably comprise from about 60% to about 99.9% by weight of all the solids in the composition. When applied by wet application techniques, such as spraying, dipping, flow coating, and electro-deposition, the composition will preferably further comprise one or more conventional mill additions such as, for example, clay, bentonite, magnesium carbonate, potassium nitrate, sodium nitrate, sodium aluminate, aluminum phosphate, boric acid, and pigments. Inorganic materials, such as zirconia, alumina, spodumene, and feldspar, can also be added to the composition in order to modify the texture and/or to adjust the roughness of the fired enamel. The composition can also be applied using conventional dry electrostatic application processes. In such instances, an organopolysiloxane is typically added to the composition to facilitate electrostatic application.

The composition according to the invention is preferably milled prior to application. Any of the conventional milling techniques can be employed. Milling fineness is not per se critical, but a fineness of about 2 g. being retained from a 50 cc sample using a 200 mesh sieve is typical for wet application techniques. A dry milling fineness of about 10% residue being retained on a 325 mesh sieve as determined using ASTM Standard C285-88 is typical when the composition is applied by dry electrostatic means.

The surface texture of the fired enamel ground coat is generally low gloss yet is glassy and non-porous. The appearance of the fired enamel can be from matte to satin depending upon the mill additions contained in the composition. Preferably, the fired enamel ground coat displays a 45° gloss of less than about 30 and a smooth surface.

The composition according to the invention is intended for use as a ground coat for steel. Conventional surface preparation can moderately improve the bond, but the composition is particularly well suited for application directly on cleaned-only steel substrates. The application rate of the composition will vary depending upon the desired thickness of the resulting fired enamel ground coat.

The composition according to the present invention is typically fired at a temperature of from about 760° C. to about 860° C. for about 2 to about 8 minutes. More preferably, the composition is fired at a temperature of from about 780° C. to about 830° C. for about 3 to about 6 minutes. It will be appreciated that firing times and temperatures are not per se critical, and a range of firing schedules could be used.

Upon firing, the composition according to the present invention forms an enamel ground coat from which baked-on foods can be removed without the need for pyrolysis or highly alkaline cleaners. The enamel composition according to the invention is particularly well-suited for application on the interior surfaces of oven cavities, dripping pans, cookware, and other articles that are exposed to the risk of baked-on food soiling. The fired enamel ground coat can be produced in a wide range of colors simply by varying the pigments included as mill additions. The presently most preferred color of the fired enamel ground coat is a dark gray (about 20 on the L a b scale).

The fired enamel ground coat is scratch resistant, stain resistant, and maintains its easy-to-clean properties over many heating cycles. In addition, baked-on food can be easily removed from the fired enamel ground coat without the need for high temperature heating cycles or highly alkaline chemical cleaners. Most baked-on foods can be removed by wiping using warm water.

The fired enamel ground coat has good acid resistance, meriting at least a B rating according to the ISO 2722 standard. In most cases, the enamel ground coat will merit an A or M rating according to the ISO 2722 standard. It has been determined that acid resistance is generally higher when the composition is applied by wet application techniques as compared to dry application techniques.

The fired enamel ground coat is durable and chemically resistant. The fired enamel ground coat will generally exhibit no chipping or other surface defects subsequent to the Plum Jam Test, which is described below:

PLUM JAM TEST

In order to objectively compare the ease from which baked-on food can be removed from fired enamel coatings, Ferro Corporation developed the "Plum Jam Test." According to the Plum Jam Test, two foods, being plum jam and olive oil, are each separately applied cold to the surface of cold enameled coupons made of enameling grade steel (carbon content about 0.05%) having the following dimension 13 cm×16 cm×1 mm. The olive oil used in the test is not critical. Any food grade olive oil can be used. However, it has been determined that various factors such as the pH, sugar content, and water content of the plum jam used in the test can influence the results of the test. Accordingly, it is important that the plum jam used in the test be a plum jam sold as Aachener Pflümli—Pflaumenmus, which is sold by Zentis of Germany, or a plum jam having the same performance characteristics as this plum jam.

The olive oil is applied dropwise to the coupons, and the plum jam is applied at a thickness of 900 $\mu$m and 2 mm, respectively, using a brush. The coupons are then heated to a temperature of 280° C. for 30 minutes to bake the foods onto the coupon. After heating, the coupons are allowed to cool to room temperature. Once cooled, the coupons are soaked for 5 minutes in 60° C. water containing 15 ml of ordinary household liquid washing detergent per 5L of water. After soaking, the coupons are evaluated to determine the ease with which baked-on food could be removed using a dry cloth and a two-sided common household cleaning sponge having both a soft side and an abrasive side according to the scoring system shown in Table I below, where a score of 5 is considered best:

TABLE I

| Step | Cleaning Method | Score |
|---|---|---|
| 1 | Surface of coupon completely cleaned by wiping with a dry cloth. | 5 |
| 2 | Surface of coupon completely cleaned by wiping with the soft side of a sponge and soaking solution. | 4 |
| 3 | Surface of coupon completely cleaned by wiping with the abrasive side of a sponge and soaking solution. | 3 |
| 4 | Surface of coupon completely cleaned by wiping with the soft side of a sponge and liquid abrasive cleaner. | 2 |
| 5 | Surface of coupon can only be cleaned, if at all, by wiping with the abrasive side sponge and liquid abrasive cleaner. | 1 |

The following examples are intended only to illustrate the invention and should not be construed as imposing limitations upon the claims.

EXAMPLE I

Frits 1, 2A, 3A, and 3B were prepared by smelting selected oxides in smelting pots at about 1400° C. to about 1430° C. for about 30 minutes and converting the molten glass to frit using water cooled rollers. Frit 1 was an alkali aluminophosphate frit. Frit 2A was a zirconia-phosphate frit. And, Frits 3A and 3B were both alkali borosilicate frits. The composition of the frits in weight percent is shown in Table II below (Note: The amount of F and $NO_2$ shown in Table II is the amount above 100.00% by weight):

TABLE II

| Oxide | Frit 1 | Frit 2A | Frit 3A | Frit 3B |
|---|---|---|---|---|
| $Al_2O_3$ | 20.96 | — | 0.06 | 0.10 |
| BaO | — | 6.70 | — | — |
| $B_2O_3$ | 2.51 | — | 13.86 | 14.29 |
| CaO | — | — | 3.02 | 1.53 |
| $Co_2O_3$ | 1.02 | 0.06 | 1.29 | 1.56 |
| CuO | 0.52 | — | 1.26 | 1.40 |
| $Fe_2O_3$ | 0.95 | — | — | — |
| $K_2O$ | — | 7.71 | — | — |
| $Li_2O$ | 1.05 | — | 2.70 | 1.80 |
| $MnO_2$ | 1.84 | — | — | — |
| $MoO_3$ | 0.37 | — | — | — |
| $Na_2O$ | 20.94 | 9.38 | 17.25 | 13.25 |
| NiO | 2.40 | — | 2.31 | 1.30 |
| $P_2O_5$ | 40.85 | 24.20 | — | — |
| $Sb_2O_3$ | 0.52 | — | — | — |
| $SiO_2$ | 6.07 | 14.86 | 53.95 | 60.52 |
| $TiO_2$ | — | 7.68 | 2.11 | 2.04 |
| $ZrO_2$ | — | 29.41 | 2.19 | 2.21 |
| TOTAL | 100.00 | 100.00 | 100.00 | 100.00 |
| F | 8.06 | 2.99 | 2.52 | 1.30 |
| $NO_2$ | 2.62 | — | 2.90 | 2.90 |

The frits were milled together with the components in the amounts shown in weight percent below in Table III to form a slip.

TABLE III

| Component | Amount |
|---|---|
| Frit 1 | 60 |
| Frit 2A | 10 |
| Frit 3A | 10 |
| Frit 3B | 20 |
| Ball Clay | 6 |
| Aluminum Oxide | 5 |
| Borax | 0.2 |
| Bentonite | 0.25 |

TABLE III-continued

| Component | Amount |
|---|---|
| Magnesium Carbonate | 0.1 |
| Potassium Carbonate | 0.15 |
| Sodium Nitrate | 0.3 |
| Aluminum Phosphate | 2 |
| Water | 55 |

The slip was milled to a fineness of about 1 g. to 2 g. residue being retained on a 200 mesh screen from a 50 cc sample. The specific gravity of the coating was adjusted to about 1.72 g/cc to about 1.74 g/cc. The slip was then sprayed onto a cleaned-only 13 cm×16 cm×1 mm sheet steel panel at a rate of about 380 g/m$^2$, dried, and then fired at a temperature of from about 780° C. to about 815° C. for about 4 to about 6 minutes to form an enamel ground coat.

The cold citric spot acid resistance of the enamel ground coat formed on the steel panel was tested in accordance with the ISO 2722 standard by placing several drops of an aqueous citric acid solution (10% by weight) under a watch glass on the fired panel and allowing it to stand for 15 minutes. The degree of etching was such that the enamel ground coat merited a rating of A. The adherence of the enamel was determined to be "good" in accordance with the procedures set forth in the ASTM C988-83 standard: "Adherence of Porcelain Enamel Cover Coats Direct-to-Steel." The color of the fired enamel ground coat was determined to be L=24.71, a=−1.17, and b=−1.14 using a Datacolor International Spectraflash SF450 spectrophotometer with a D65 10° source. The 45° gloss of the enamel ground coat was determined to be 17 using a BYK Gardner 45° gloss meter. Finally, the enamel ground coat was tested for ease of baked-on food removal using the Plum Jam Test previously described above. The enamel ground coat received a score of 5 for both baked-on plum jam (900 μm and 2.0 mm) and olive oil.

EXAMPLE II

Frits 1, 2A, 3A and 3B from Example I were mixed in the same proportions as in Example I. About 1.0% by weight of an organopolysiloxane was added to the mixture and then the mixture was dry milled in a ball mill to a fineness of 11.0%±0.5% residue being retained on a 325 mesh sieve as determined using ASTM Standard C285-88. The resulting powder had a bulk resistivity of about 5×10$^{15}$ ohm/cm to about 80×10$^{15}$ ohm/cm. After milling, the composition was applied using a standard corona discharge gun at 50 kV to about 100 kV to a cleaned-only 13 cm×16 cm×1 mm sheet steel panel at a rate of about 380 g/m$^2$. The panel was then fired at about 770° C. for about 3 minutes. The enamel ground coat exhibited a matte surface appearance. The enamel ground coat merited a cold citric spot acid resistance rating of B when tested in accordance with the ISO 2722 standard.

EXAMPLE III

Glass frit 2B was prepared by smelting selected oxides in a smelting pot at about 1400° C. to about 1430° C. for about 30 minutes and converting the molten glass to frit using water cooled rollers. Glass frit 2B was a zirconia-phosphate glass frit. The composition of the frit in weight percent is shown in Table IV below (Note: The amount of F and NO$_2$ shown in Table IV is the amount above 100.00% by weight):

TABLE IV

| Component | Frit 2B |
|---|---|
| Al$_2$O$_3$ | — |
| BaO | 6.91 |
| B$_2$O$_3$ | |
| Co$_2$O$_3$ | 1.52 |
| CuO | — |
| Fe$_2$O$_3$ | — |
| K$_2$O | 8.20 |
| Li$_2$O | — |
| MnO$_2$ | |

TABLE IV-continued

| Component | Frit 2B |
|---|---|
| MoO$_3$ | — |
| Na$_2$O | 9.69 |
| NiO | 1.41 |
| P$_2$O$_5$ | 24.97 |
| Sb$_2$O$_3$ | — |
| SiO$_2$ | 16.94 |
| ZrO$_2$ | 30.37 |
| TOTAL | 100.00 |
| F | 6.12 |
| NO$_2$ | 1.17 |

Frit 1 from Example I and Frit 2B were milled together with the components in the amounts shown in weight percent below in Table V to form a slip.

TABLE V

| Component | Amount |
|---|---|
| Frit 1 | 70 |
| Frit 2B | 30 |
| Ball Clay | 6 |
| Aluminum Oxide | 5 |
| Borax | 0.2 |
| Bentonite | 0.25 |
| Magnesium Carbonate | 0.1 |
| Potassium Carbonate | 0.15 |
| Sodium Nitrate | 0.3 |
| Aluminum Phosphate | 2 |
| Water | 55 |

The slip was milled to a fineness of about 1 g. to 2 g. residue being retained on a 200 mesh screen from a 50 cc sample. The specific gravity of the coating was adjusted to about 1.72 g/cc to about 1.74 g/cc. The slip was then sprayed onto a cleaned-only 13 cm×16 cm×1 mm sheet steel panel at a rate of about 380 g/m$^2$, dried, and then fired at a temperature of from about 780° C. to about 815° C. for about 4 to about 6 minutes to form an enamel ground coat.

The cold citric spot acid resistance of the enamel ground coat formed on the steel panel was tested in accordance with the ISO 2722 standard by placing several drops of an aqueous citric acid solution (10% by weight) under a watch glass on the fired panel and allowing it to stand for 15 minutes. The degree of etching was such that the enamel ground coat merited a rating of AA. The adherence of the enamel was determined to be "good" in accordance with the procedures set forth in the ASTM C988-83 standard: "Adherence of Porcelain Enamel Cover Coats Direct-to-Steel."

EXAMPLE IV

Frits 1, 2A, 2B, 3A, and 3B from Examples I and III were milled together with the components in the amounts shown in weight percent below in Table VI to form a slip.

TABLE VI

| Component | Amount |
|---|---|
| Frit 1 | 60 |
| Frit 2A | 10 |
| Frit 2B | 15 |
| Frit 3A | 5 |
| Frit 3B | 10 |

TABLE VI-continued

| Component | Amount |
|---|---|
| Ball Clay | 6 |
| Aluminum Oxide | 5 |
| Borax | 0.2 |
| Bentonite | 0.25 |
| Magnesium Carbonate | 0.1 |
| Potassium Carbonate | 0.15 |
| Sodium Nitrate | 0.3 |
| Aluminum Phosphate | 2 |
| Water | 55 |

The slip was milled to a fineness of about 1 g. to 2 g. residue being retained on a 200 mesh screen from a 50 cc sample. The specific gravity of the coating was adjusted to about 1.72 g/cc to about 1.74 g/cc. The slip was then sprayed onto a cleaned-only 13 cm×16 cm×1 mm sheet steel panel at a rate of about 380 g/m$^2$, dried, and then fired at a temperature of about 805° C. for about 3 minutes to form an enamel ground coat.

The enamel ground coat exhibited a matte surface appearance. The enamel ground coat merited a cold citric spot acid resistance rating of AA when tested in accordance with the ISO 2722 standard. The adherence of the enamel was determined to be "good" in accordance with the procedures set forth in the ASTM C988-83 standard: "Adherence of Porcelain Enamel Cover Coats Direct-to-Steel." The color of the fired enamel ground coat was determined to be L=23.6, a=0.3, b=−0.3 using a Datacolor International Spectraflash SF450 spectrophotometer with a D65 10° source. The 45° gloss of the enamel ground coat was determined to be 24.9 using a BYK Gardner 45° gloss meter.

Baked-on food is easily removed from the fired enamel ground coat according to the invention upon exposure to warm water, hot water, and/or steam. When the composition is applied to cookware and other submersible articles, baked-on food can be easily removed upon soaking the article in warm water (e.g., about 60° C., more or less) for about 10 minutes. Oven cavities can be cleaned by producing steam in the oven cavity or by applying hot water to the interior surfaces of the oven using a sponge. The present invention provides a composition for obtaining an enamel ground coat on steel that exhibits good cleanability, very good acid resistance, and that does not exhibit chipping, marking, or other surface defects after a Plum Jam Test.

The present invention is also directed to an article having at least one steel surface coated with an enamel ground coat. The enamel ground coat is formed by applying the composition according to the invention to the steel surface and then firing the composition. Preferably, the enamel ground coated surface of the article merits a cold citric spot acid resistance rating of A or better in accordance with the procedures set forth in the ISO 2722 standard and a bond adherence rating of "good" or better in accordance with the ASTM-C988-83 standard.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed:

1. A composition for use in forming an enamel ground coat on steel substrates comprising a glass component comprising a blend of from about 40% to about 70% by weight of a first glass portion comprising one or more alkali aluminophosphate frits, up to about 30% by weight of a second glass portion comprising one or more zirconia-phosphate frits, and up to about 30% by weight of a third glass portion comprising one or more alkali borosilicate frits.

2. The composition according to claim 1 wherein said alkali aluminophosphate frits comprise by weight from about 30% to about 50% $P_2O_5$, from about 20% to about 25% $Al_2O_3$, from about 10% to about 25% $Na_2O$, up to about 10% $K_2O$, up to about 10% $SiO_2$, up to about 5% $B_2O_3$, from about 1% to about 3% NiO, from about 1% to about 2% $MnO_2$, from about 1% to about 3% $Co_2O_3$, up to about 3% $Li_2O$, from about 0.5% to about 1.5% $Fe_2O_3$, from about 1% to about 2% CuO, up to about 1% $Sb_2O_3$, and up to about 0.5% $MoO_3$, and up to about 4% ZnO.

3. The composition according to claim 1 wherein said zirconia-phosphate frits comprise by weight from about 25% to about 35% $ZrO_2$, from about 20% to about 30% $P_2O_5$, from about 10% to about 20% $SiO_2$, from about 10% to about 25% $Na_2O$, from about 5% to about 10% $K_2O$, up to about 8% $TiO_2$, up to about 7% BaO, from about 0.05% to about 3% $Co_2O_3$, and up to about 3% NiO.

4. The composition according to claim 1 wherein said alkali borosilicate frits comprise by weight from about 40% to about 60% $SiO_2$, from about 10% to about 25% $Na_2O$, from about 10% to about 15% $B_2O_3$, up to about 5% CaO, up to about 3% $Li_2O$, up to about 5% $TiO_2$, from about 1% to about 5% $ZrO_2$, from about 1% to about 3% NiO, from about 1% to about 3% $Co_2O_3$, from about 1% to about 2% CuO, and up to about 1% $Al_2O_3$.

5. The composition according to claim 1 wherein after firing said composition forms an enamel ground coat having a gloss of less than 30 as measured using a BYK Gardner 45° gloss meter.

6. The composition according to claim 1 wherein after firing said composition forms an enamel ground coat that merits a cold citric spot acid resistance rating of B or better in accordance with the procedures set forth in the ISO 2722 standard.

7. The composition according to claim 1 wherein after firing said composition forms an enamel ground coat that merits a cold citric spot acid resistance rating of A or better in accordance with the procedures set forth in the ISO 2722 standard.

8. The composition according to claim 1 wherein after firing said composition forms an enamel ground coat that merits a cold citric spot acid resistance rating of AA in accordance with the procedures set forth in the ISO 2722 standard.

9. The composition according to claim 1 wherein after firing said composition forms an enamel ground coat that merits a bond adherence rating of "good" or better in accordance with the ASTM-C988-83 standard.

10. A composition for use in forming an enamel ground coat on steel substrates comprising a glass component comprising a blend of:

from about 40% to about 70% by weight of a first glass portion comprising one or more alkali aluminophosphate frits comprising by weight from about 30% to about 50% $P_2O_5$, from about 20% to about 25% $Al_2O_3$, from about 10% to about 25% $Na_2O$, up to about 10% $K_2O$, up to about 10% $SiO_2$, up to about 5% $B_2O_3$, from about 1% to about 3% NiO, from about 1% to about 2% $MnO_2$, from about 1% to about 3% $Co_2O_3$, up to about 3% $Li_2O$, from about 0.5% to about 1.5% $Fe_2O_3$, from about 1% to about 2% CuO, up to about 1% $Sb_2O_3$, and up to about 0.5% $MoO_3$, and up to about 4% ZnO;

up to about 30% by weight of a second glass portion comprising one or more zirconia-phosphate frits comprising by weight from about 25% to about 35% $ZrO_2$, from about 20% to about 30% $P_2O_5$, from about 10% to about 20% $SiO_2$, from about 10% to about 25% $Na_2O$, from about 5% to about 10% $K_2O$, up to about 8% $TiO_2$, up to about 7% BaO, from about 0.05% to about 3% $Co_2O_3$, and up to about 3% NiO; and up to about 30% by weight of a third glass portion comprising one or more alkali borosilicate frits comprising by weight from about 40% to about 60% $SiO_2$, from about 10% to about 25% $Na_2O$, from about 10% to about 15% $B_2O_3$, up to about 5% CaO, up to about 3% $Li_2O$, up to about 5% $TiO_2$, from about 1% to about 5% $ZrO_2$, from about 1% to about 3% NiO, from about 1% to about 3% $Co_2O_3$, from about 1% to about 2% CuO, and up to about 1% $Al_2O_3$.

11. The composition according to claim 10 wherein after firing said composition forms an enamel ground coat having a gloss of less than 30 as measured using a BYK Gardner 45° gloss meter.

12. The composition according to claim 10 wherein after firing said composition forms an enamel ground coat that merits a cold citric spot acid resistance rating of B or better in accordance with the procedures set forth in the ISO 2722 standard.

13. The composition according to claim 10 wherein after firing said composition forms an enamel ground coat that merits a cold citric spot acid resistance rating of A or better in accordance with the procedures set forth in the ISO 2722 standard.

14. The composition according to claim 10 wherein after firing said composition forms an enamel ground coat that merits a cold citric spot acid resistance rating of AA in accordance with the procedures set forth in the ISO 2722 standard.

15. The composition according to claim 10 wherein after firing said composition forms an enamel ground coat that merits a bond adherence rating of "good" or better in accordance with the ASTM-C988-83 standard.

16. An article having at least one steel surface coated with an enamel ground coat, said enamel ground coat having been formed by applying a composition to said steel surface and then firing said composition, said composition comprising a glass component comprising a blend of from about 40% to about 70% by weight of a first glass portion comprising one or more alkali aluminophosphate frits, up to about 30% by weight of a second glass portion comprising one or more zirconia-phosphate frits, and up to about 30% by weight of a third glass portion comprising one or more alkali borosilicate frits.

17. The article according to claim 16 wherein said alkali aluminophosphate frits comprise by weight from about 30% to about 50% $P_2O_5$, from about 20% to about 25% $Al_2O_3$, from about 10% to about 25% $Na_2O$, up to about 10% $K_2O$, up to about 10% $SiO_2$, up to about 5% $B_2O_3$, from about 1% to about 3% NiO, from about 1% to about 2% $MnO_2$, from about 1% to about 3% $Co_2O_3$, up to about 3% $Li_2O$, from about 0.5% to about 1.5% $Fe_2O_3$, from about 1% to about 2% CuO, up to about 1% $Sb_2O_3$, and up to about 0.5% $MoO_3$, and up to about 4% ZnO, said zirconia-phosphate frits comprise by weight from about 25% to about 35% $ZrO_2$, from about 20% to about 30% $P_2O_5$, from about 10% to about 20% $SiO_2$, from about 10% to about 25% $Na_2O$, from about 5% to about 10% $K_2O$, up to about 8% $TiO_2$, up to about 7% BaO, from about 0.05% to about 3% $Co_2O_3$, and up to about 3% NiO, and said alkali borosilicate frits comprise by weight from about 40% to about 60% $SiO_2$, from about 10% to about 25% $Na_2O$, from about 10% to about 15% $B_2O_3$, up to about 5% CaO, up to about 3% $Li_2O$, up to about 5% $TiO_2$, from about 1% to about 5% $ZrO_2$, from about 1% to about 3% NiO, from about 1% to about 3% $Co_2O_3$, from about 1% to about 2% CuO, and up to about 1% $Al_2O_3$.

18. The article according to claim 17 wherein said enamel ground coat merits a cold citric spot acid resistance rating of A or better in accordance with the procedures set forth in the ISO 2722 standard and a bond adherence rating of "good" or better in accordance with the ASTM-C988-83 standard.

* * * * *